UNITED STATES PATENT OFFICE.

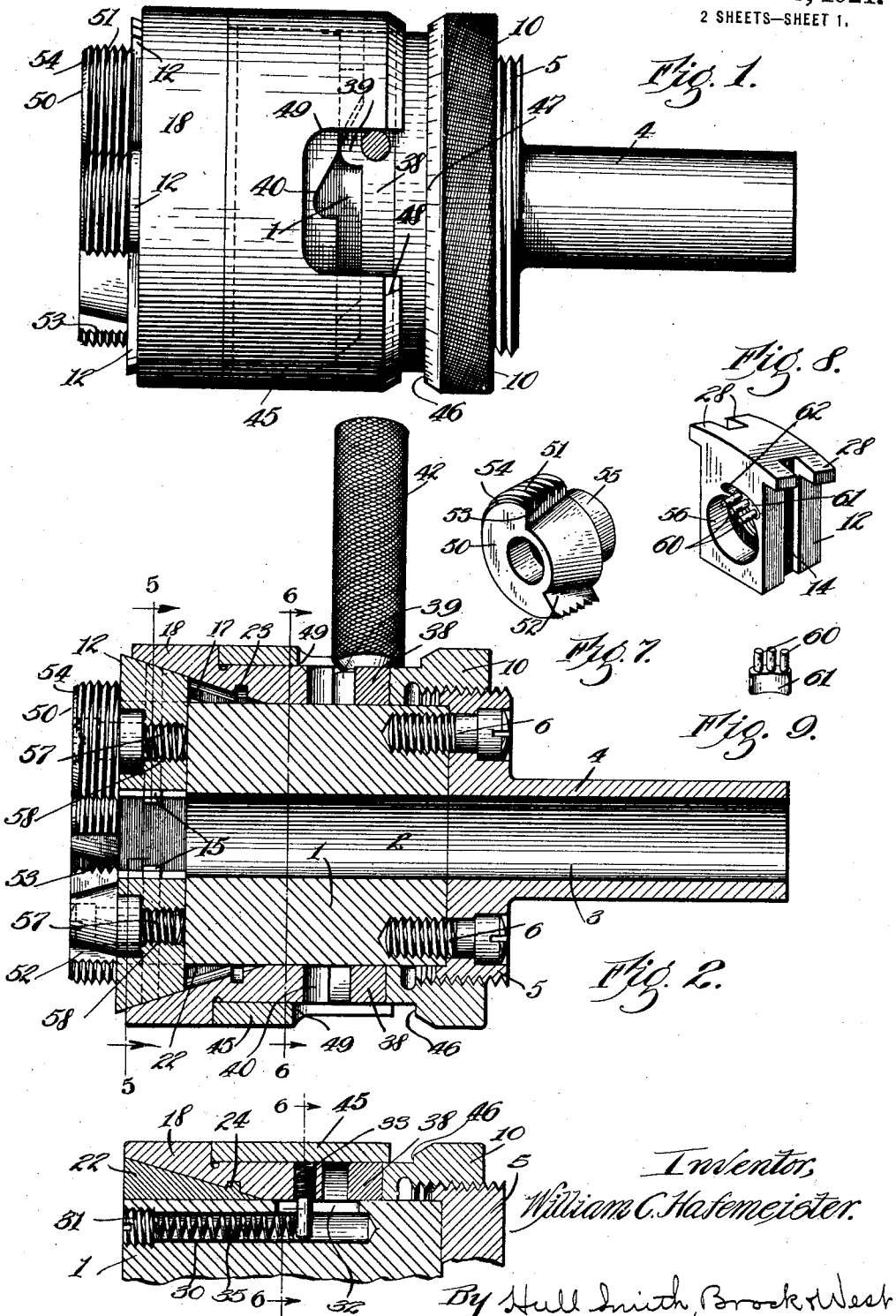

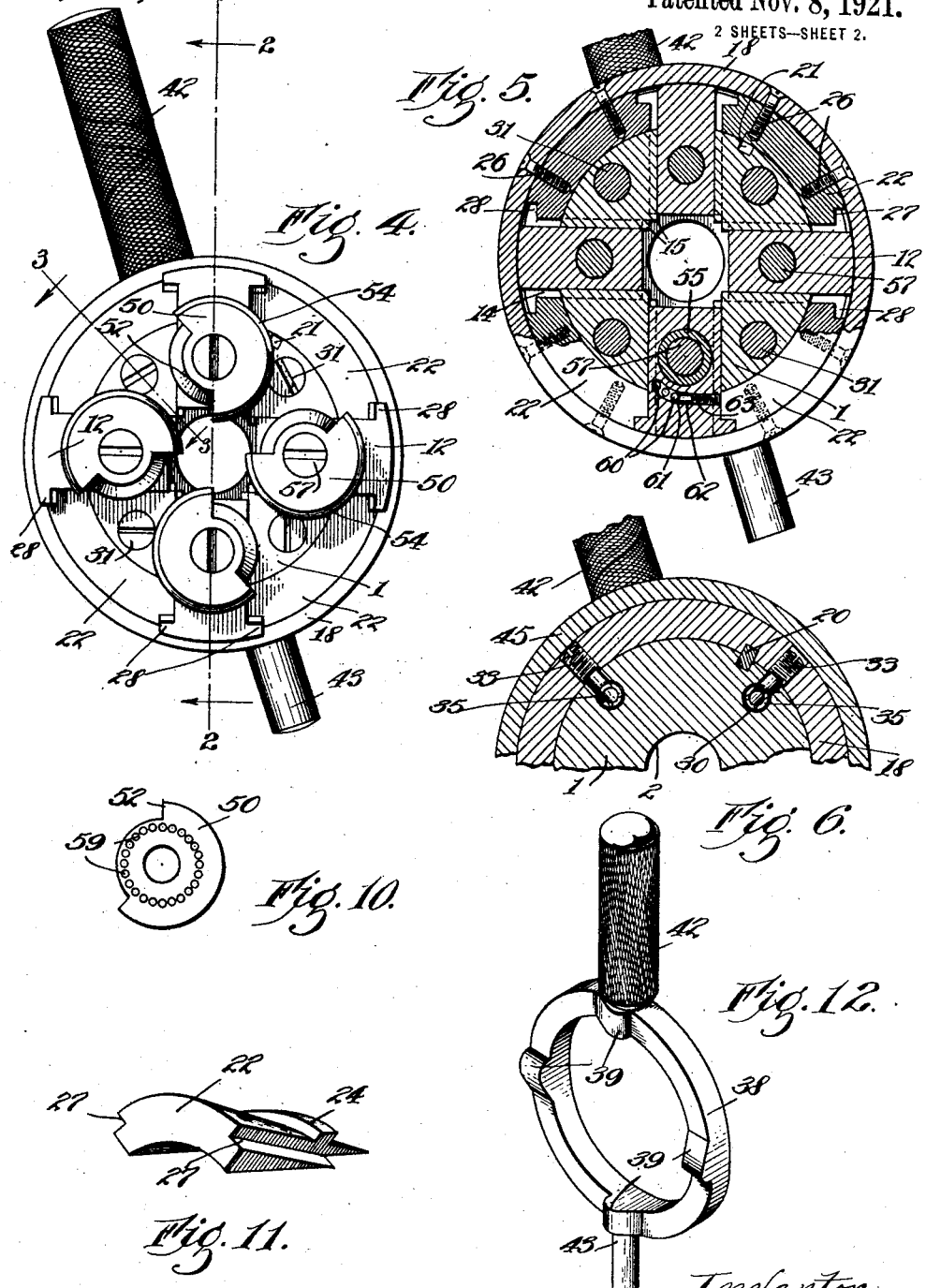

WILLIAM C. HAFEMEISTER, OF CLEVELAND, OHIO, ASSIGNOR TO G. H. SCOTT MACHINE COMPANY, OF CLEVELAND, OHIO, A COPARTNERSHIP CONSISTING OF GEORGE H. SCOTT AND CARL S. FETZER.

THREAD-CUTTING APPARATUS.

1,396,572.      Specification of Letters Patent.      Patented Nov. 8, 1921.

Application filed November 15, 1917. Serial No. 202,121.

*To all whom it may concern:*

Be it known that I, WILLIAM C. HAFEMEISTER, a citizen of the United States, residing at Cleveland, in the county of Cuyahoga and State of Ohio, have invented a certain new and useful Improvement in Thread-Cutting Apparatus, of which the following is a full, clear, and exact description, reference being had to the accompanying drawings.

This invention is directed to improvements in thread cutting apparatus, adapted for use in lathes, and relates more particularly to a novel design of chaser, and to a peculiar relation between the phase of the threads of the respective chasers of a set and the arrangement of the said chasers in the set.

The general purposes of the invention are to provide a very accurate thread cutting apparatus which operates easily and is capable of a comparatively wide range of adjustments to adapt it to pieces of work of different diameters, and materials of various qualities or degrees of hardness—the chasers being adjustable to vary the rake angle in the attainment of the last mentioned result, as well as for the purpose of obtaining different effects upon the work; and to provide apparatus of the aforesaid character wherein the chasers are exterior of the die head thereby facilitating lubrication, ready inspection of the work, and obviating the accumulation or lodgment of chips within the die head or any working parts thereof.

A further and very important object of the invention is the provision of a chaser of extremely long life which may be sharpened from time to time by grinding its cutting lip or face. By thus imposing the grinding upon the cutting lip or face, the original throat is preserved throughout the life of the chaser; and moreover the cutting lip or face may be ground to certain shapes suitable to special kinds of work. The fact that the throat of the chaser remains constant is important when the chaser is used for cutting threads adjacent a shoulder or enlargement upon a piece of work, for it enables the thread to be cut to within a distance from the shoulder or enlargement equal to the depth of the original throat throughout the entire period of usefulness of the chaser. This distinguishes my chaser from prevailing types where the chaser is sharpened from time to time by grinding away its forward cutting portion thus enlarging its throat.

In carrying out my invention, I employ a set of circular chasers having external threads, preferably inclined in a direction reverse to that of the threads to be cut, and the chasers are peripherally notched to produce on each a cutting face or lip, and are arranged upon a die head with their cutting lips or faces spaced about a circle concentric with the axis of the head. When so arranged, the threads of successive chasers progress relatively in phase, correspondingly as the chasers are angularly spaced about the circle. This provides a lead which corresponds to the lead of the thread that is to be cut; and the opposite inclination of the threads of the chasers to that of the cut thread insures against any binding between the threads of the chaser and the work. The contour of the circular chaser provides a natural clearance to the rear of its cutting face or lip, and its circular formation and substantial massive body construction prevent injury or distortion from tempering.

The die head disclosed herein is of a type which acts automatically to release the chasers from the work when a given extent of thread has been cut; and further objects of the invention consist in improving die heads of this character to render them convenient of operation in closing the dies; positive of operation in releasing the dies; wherein all parts subjected to wear may be hardened to prolong the life of the head; wherein the operating parts accurately fit and such fit is maintained throughout the life of the head, while at the same time, the parts move with perfect ease; wherein the chaser carriers are firmly held when the chasers are in cutting position; and to provide a die head of the aforesaid character which may be conveniently assembled, and easily and accurately adjusted.

The objects above enumerated and others which will become apparent as this description proceeds are attained in a construction illustrated in the accompanying drawings, and while I shall proceed to describe this construction specifically, I wish it to be understood as not limiting myself to the structural details thereof further than is required by the terms of the claims annexed hereto.

In the drawings, Figure 1 is a side elevation of my improved thread cutting apparatus; Fig. 2 is a central longitudinal section, as indicated by the line 2—2 of Fig. 4; Fig. 3 is a fragmentary section through the die head in a plane parallel to but angularly spaced from that of the previous view, as indicated by the line 3—3 of Fig. 4; Fig. 4 is a front elevation of the apparatus; Fig. 5 is a section substantially on the line 5—5 of Fig. 2; Fig. 6 is a section through the upper part of the head, on the line 6—6 of Fig. 2; Fig. 7 is a perspective view of one of the chasers; Fig. 8 is a similar view of a chaser carrier; Fig. 9 shows in perspective, a chaser positioning member; Fig. 10 is a rear face view of a chaser; Fig. 11 a perspective view of one of the filler blocks used in the construction of the head; and Fig. 12 is a similar view of the cam element through which the head is actuated to open and close the chasers.

The die head is made up of a cylindrical stock 1 having a central bore 2 which registers with the bore 3 of a shank 4 having an enlargement 5 that is secured to the rear end of the stock 1 by screws 6, the front face of the enlargement being recessed to receive the adjacent end of the stock, and externally threaded for the application of a knurled nut 10 the forward end of which is reduced in diameter to fit the stock 1. For the purposes of claims, all the foregoing parts excepting the nut 10 may be considered the "stock."

Chaser carriers 12 are slidable within radial guideways in the forward end of the stock 1 and are shown as having channels 14 in their sides which receive ribs 15 that are formed along the sides of the guideways. The outer ends of the carriers are designed to accurately fit the adjacent wall portion of a frusto conical recess 17 formed in the end of a shell 18 that surrounds the stock 1. The shell is capable of longitudinal movement upon the stock, but is held against rotary movement with respect thereto by a key 20 which occupies a spline 21 in the stock, and a suitable recess in the shell. A segmental filler block 22 (Fig. 10) fills the portion of the recess 17 between adjacent carriers 12, the filler block being wedge-shaped from front to rear according to the shape of the recess. Near the rear end of the recess the shell 18 has an annular groove 23 that receives ribs 24 of the filler blocks to hold the blocks firmly against withdrawal from the recess, although the blocks are further held in place by screws 26 which extend through the shell and into the blocks. The opposed upper corners of each of the filler blocks 22 are rabbeted at 27 to receive the lateral projections 28 of the carriers 12. As a consequence of this construction, the carriers will be slid radially when the shell 18 is moved longitudinally of the stock. This movement of the shell is accomplished through mechanism which will now be described.

Between the outer ends of adjacent guide-ways 13, the stock 1 is provided with a bore 30 (Fig. 3) which is tapped at its outer end for the reception of a screw plug 31 and the bore opens near its inner end, through the side of the stock, through a slot 32. A screw 33 is threaded through the shell 18, and its reduced inner end extends through the slot 32 and into the bore 30. A compression spring 35 is interposed between the inner end of screw 33 and the screw plug 31. The springs 35 thus impose a rearward thrust upon the shell 18. It will be observed from Figs. 1 to 3 that the rear end of the shell 18 is spaced from the forward end of the previously mentioned knurled nut 10, and mounted for free rotation upon the stock 1 between the shell and nut is what I shall term a cam ring or annulus 38. The adjacent faces of the ring and shell are provided, respectively, with cam projections 39 and recesses 40 which are shown as corresponding in shape. Now, when the cam ring is rotated in a direction away from the observer (as the parts are shown in Figs. 1 to 3) the shell 18 will be moved forwardly through the action of the cams 39 and in opposition to the springs 35. The forward movement of the shell forces the carriers 12 inward by reason of the engagement of the inclined wall of the recess 17 with the outer ends of the carriers. A handle 42 is applied to the cam ring for moving it in the direction above mentioned, and it is adapted to be returned to normal position by the engagement of a stud 43, shown as extending from the ring diametrically opposite the handle 42, with a member carried by the lathe and bearing a fixed relation to the work. This is in accordance with well known practice and is deemed unnecessary of illustration or further description.

Somewhat to the rear of its forward end the shell 18 is reduced in external diameter for the application of a sleeve 45. This sleeve extends rearwardly to practically meet the shoulder 46 of the nut 10, when the cams 39 of the ring 38 occupy the recesses 40 of the shell 18—in other words, when the chasers are in open position. It will be observed that the adjacent peripheral surfaces of the nut 10 and sleeve 45 are beveled and that the nut is provided with graduations 47, while the sleeve has an index mark 48. Now by turning the nut 10 to alter its position with respect to the stock 1, the normal position of the shell 18 may be varied; and this adjustment is transmitted to the carriers 12 through the connection of the carriers with the shell. It will be seen, therefore, that the head may be adjusted to different sizes of work by turning the nut 10, and that the degree of adjustment will be indicated by the coöperating graduations of the nut and the index mark of the sleeve. The sleeve 45 is shown as notched at 49 for the accommodation of the handle 42 and the stud 43.

The chasers are designated 50, and each is composed of a circular body portion having an exterior thread 51 (preferably left-hand when the chaser is intended for cutting right-hand threads and vice versa) and the periphery of the chaser is notched, as indicated at 52, to produce a cutting face or lips 53. The chasers are associated in sets and a given relation exists between the phase of the thread of each chaser and and its respective position in the set. With the chasers arranged so that their cutting faces or lips are spaced about an imaginary circle or orbit, the threads of the successive chasers relatively progress correspondingly as the chasers are spaced about the circle or orbit. Consequently there is a lead established between the cutting faces of the threads of the several chasers coinciding with the thread that is to be cut; and while I have stated that for cutting right hand threads, left hand threaded chasers are preferably employed, it is obvious that this condition is not supremely important, as annular ridges might be substituted for the threads with reasonably good results. However, by making the inclination of the threads of the chasers opposite to that of the cut thread, the portions of the chaser threads adjacent the cutting faces follow the cut threads comfortably and without any possibility of binding. It has already been pointed out that the contour of the circular chaser provides a natural clearance to the rear of the cutting lip or edge. As will be hereinafter explained, means are provided for adjusting the rake angle of the cutting lips of the chasers to suit them to various conditions, or for the purpose of rendering different effects upon the work. For instance, if the cutting lip of a chaser is set slightly in advance of a straight line between the axis of the work and that of the chaser, the portions of the chaser threads through which the aforesaid line passes would have a smoothing down or burnishing effect upon the threads of the work.

The forward ends of the chasers are chamfered at 54 to produce what I have hereinbefore referred to as a throat, a feature common to dies for cutting external threads. It is evident that sharpening does not affect the throat of my chasers, whereas in other chasers, they are sharpened by enlarging the throat.

Each chaser is provided with a cylindrical shank 55, which occupies a correspondingly shaped recess 56 in the front face of its respective carrier 12, and the chaser has a central bore through which a screw 57 passes and is threaded into the tapped hole 58 of the carrier, the forward end of the bore of the chaser being enlarged to receive the head of the screw, and to produce a shoulder against which the rear end of the head is adapted to engage to clamp the chaser firmly against the carrier. As shown in Fig. 10, the rear face of the chaser is provided with a circular series of equally spaced holes 59 which receive pins 60 that are carried by a member 61, (Fig. 9) contained within a recess 62 (Figs. 5 and 8) opening through the front face of the carrier and with which a transverse bore registers that leads in through the side of the carrier, said bore being threaded for the reception of a screw 63. The inner end of this screw engages the member 61 to adjust it longitudinally of the recess 62. Consequently, the chaser 50 may be adjusted angularly on its axis by the operation of the screw 63; and it may be explained that the angle of adjustment is quite equal to the distance between adjacent holes 59 of the chaser. Accordingly, a very close adjustment may be had first, through the medium of the screw, and second, by turning the chasers around the distance between adjacent holes. This adjustment is employed to set the chasers accurately in the original instance, as well as after they have been ground. It may be further explained that the turning tendency of the chasers in the cutting operation is opposed by the screws 63, and is in a direction to tighten the screws 57. The chasers, therefore, will be held very securely in accurate position.

Having thus described my invention, what I claim is:—

1. In combination, a set of circular chasers peripherally notched to produce cutting lips, a sustaining device whereon said chasers are adapted to be arranged with their cutting lips spaced about an imaginary circle substantially concentric with the axis of the sustaining device, each chaser having a recess, a member projecting into the recess of each chaser and movably carried by the sustaining device, and a screw adjustable within the sustaining device to alter the position of said member.

2. In combination, a set of circular chasers peripherally notched to produce cutting lips, a sustaining device whereon said chasers are adapted to be arranged with their cutting lips spaced about an imaginary circle substantially concentric with the axis of the sustaining device, each chaser having a recess, a member projecting into the recess of each chaser and movably carried by the sustaining device, and a screw adjustable within the sustaining device to alter the position of said member, the screw being disposed in opposition to any turning tendency of the chaser in the cutting operation.

3. In combination, a circular chaser peripherally notched to produce a cutting lip, a sustaining device whereon said chaser is supported, the chaser having a recess, a positioning member arranged to be received by said recess and movably carried by the sustaining device, and a screw adjustable within the sustaining device for altering the position of the aforesaid member.

4. In combination, a set of circular chasers peripherally notched to produce cutting lips, a sustaining device whereon said chasers are adapted to be arranged with their cutting lips spaced about an imaginary circle substantially concentric with the axis of the sustaining device, each chaser having a circular series of recesses concentric with its axis and spaced equidistant apart, a positioning member arranged to be received by said recesses and movably carried by the sustaining device, said member being capable of a movement not less than the distance between adjacent recesses, and a screw adjustable within the sustaining device for altering the position of the aforesaid member.

5. In apparatus of the character set forth, the combination of a stock, carriers sustained thereby, circular chasers supported by the carriers with their axes parallel at all times, a shell surrounding and movable longitudinally of the stock, interlocking connections between the shell and carriers for imparting a radial parallel movement to the carriers in a plane perpendicular to the axis of the stock upon a longitudinal movement of the shell in either direction, and means for moving the shell as aforesaid.

6. In apparatus of the character set forth, the combination of a stock having radially disposed guideways in one of its ends, carriers confined within said guideways to a straight course of movement that is perpendicular to the longitudinal axis of the stock, a member having adjustable connection with the opposite end of the stock, a shell movable longitudinally of the stock, an actuating element between opposed parts of the shell and member operable to create relative movement between the shell and member thereby to move the shell longitudinally of the stock, interfitting connections between the carriers and shell through which the carriers are positively moved within the guideways by a longitudinal movement of the shell in either direction, and chasers supported by the carriers with the cutting lip of each parallel with those of the others at all times.

7. In apparatus of the character set forth, the combination of a stock having radially disposed guideways at its forward end, a shell surrounding the stock and having a frustoconical recess in its forward end, carriers slidable within the aforesaid guideways and having outer ends that fit and engage the frustoconical wall of the recess, filler blocks disposed between the outer ends of adjacent carriers, the filler blocks and shell being rigidly connected, and the filler blocks and carriers having interengaging portions whereby the outer ends of the carriers are held in engagement with the shell, means tending to impel the shell rearwardly with respect to the stock, means for moving the shell in opposition to the former means, and chasers supported by the carriers.

8. In apparatus of the character set forth, the combination of a stock having radially disposed guideways, a shell surrounding the stock and having a frustoconical recess, carriers slidable within the aforesaid guideways and having their outer ends engaging the frustoconical wall of the recess, filler blocks disposed between the outer ends of adjacent carriers, the filler blocks and shell being rigidly connected, and the filler blocks and carriers having interengaging portions whereby the outer ends of the carriers are held in engagement with the shell, means for moving the shell longitudinally of the stock, and chasers supported by the carriers.

9. In apparatus of the character set forth, the combination of a stock, carriers supported by the forward end of the stock, a member screw threaded upon the rear end of the stock, a shell surrounding the stock and movable longitudinally thereof, connections between the shell and carriers through which the carriers are moved radially upon a longitudinal movement of the shell, an annulus surrounding the stock and located between the aforesaid member and the rear end of the shell, said member and the shell having opposed bearing portions, the annulus bearing against one of said portions while the other of said portions and the annulus are provided with coöperating parts through which a separation between the member and shell is created by a rotary movement of the annulus, the shell and the aforesaid member having coöperating indications, means tending to impel the shell toward the member, and chasers supported by the carriers.

10. In apparatus of the character set forth, the combination of a stock provided with exterior screw threads at its rear end and radially disposed guideways at its forward end, carriers slidable within the guideways, a shell surrounding the forward portion of the stock and movable longitudinally with respect thereto, the forward end of the shell having guideways inclined with respect to the longitudinal axis of the stock, and the carriers having parts coöperating with said guideways whereby a radial movement is imparted to the carriers by a longitudinal movement of the shell, a member screwed upon the rear end of the stock and having its front face opposed to the rear end of the shell, means tending to move the shell toward said member, an annulus surrounding the stock and located between the member and shell, the annulus being provided with cam portions for coöperation with one of the parts adjacent to it thereby to create a separation between the member and shell when the annulus is rotated, a sleeve carried by the shell and overhanging the annulus and projecting into proximity to the member, the member and sleeve having coöperating indications, and chasers supported by the carriers.

11. In combination, a circular chaser peripherally notched to produce a cutting lip, a sustaining device whereon said chaser is supported, the chaser having a recess, a positioning member arranged to be received by said recess and movably carried by the sustaining device, and means for adjusting the positioning member with respect to the sustaining device.

In testimony whereof, I hereunto affix my signature.

WILLIAM C. HAFEMEISTER.